United States Patent
Kim et al.

(10) Patent No.: US 12,509,411 B2
(45) Date of Patent: *Dec. 30, 2025

(54) CYCLODODECANONE AND PREPARATION METHOD THEREFOR

(71) Applicant: HANWHA SOLUTIONS CORPORATION, Seoul (KR)

(72) Inventors: Jiyeon Kim, Daejeon (KR); Hyun Seo, Daejeon (KR); Namjin Jang, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 759 days.

This patent is subject to a terminal disclaimer.

(21) Appl. No.: 17/772,167

(22) PCT Filed: Oct. 26, 2020

(86) PCT No.: PCT/KR2020/014666
§ 371 (c)(1),
(2) Date: Apr. 27, 2022

(87) PCT Pub. No.: WO2021/085966
PCT Pub. Date: May 6, 2021

(65) Prior Publication Data
US 2023/0002299 A1 Jan. 5, 2023

(30) Foreign Application Priority Data

Oct. 29, 2019 (KR) .......................... 10-2019-0135498

(51) Int. Cl.
| | |
|---|---|
| *C07C 45/58* | (2006.01) |
| *B01J 23/30* | (2006.01) |
| *B01J 27/16* | (2006.01) |
| *B01J 31/02* | (2006.01) |
| *C07C 45/80* | (2006.01) |
| *C07C 49/413* | (2006.01) |

(52) U.S. Cl.
CPC .............. *C07C 45/58* (2013.01); *B01J 23/30* (2013.01); *B01J 27/16* (2013.01); *B01J 31/0237* (2013.01); *C07C 45/80* (2013.01); *C07C 49/413* (2013.01)

(58) Field of Classification Search
CPC ....... C07C 41/06; C07C 49/413; C07C 45/58; C07C 45/86
See application file for complete search history.

(56) References Cited

U.S. PATENT DOCUMENTS

| | | | |
|---|---|---|---|
| 3,880,920 A | | 4/1975 | Wampfler |
| 2001/0023071 A1* | | 9/2001 | Sugise ................ C07C 45/58 435/148 |
| 2009/0326277 A1* | | 12/2009 | Pinkos ................ C07C 45/58 568/366 |
| 2016/0031783 A1 | | 2/2016 | Micoine |
| 2016/0031784 A1 | | 2/2016 | Micoine |

FOREIGN PATENT DOCUMENTS

| | | | |
|---|---|---|---|
| CN | 101479227 A | 7/2009 | |
| CN | 105315146 A | 2/2016 | |
| EP | 1125909 A1 | 8/2001 | |
| EP | 1411051 A1 | 4/2004 | |
| JP | 2001226311 A | 8/2001 | |
| JP | 2004059434 A | 2/2004 | |
| JP | 2009541439 A | 11/2009 | |
| JP | 2016034938 A | 3/2016 | |
| KR | 20070020016 A | 2/2007 | |
| WO | WO-2020130292 A1 * | 6/2020 | .............. B01J 23/30 |

OTHER PUBLICATIONS

Machine translation WO2020130292A1, Jun. 25, 2020, pp. 1-22 (Year: 2020).*
An European Search Report issued on Oct. 12, 2023 for corresponding EP Patent Application.
An Office action issued on Sep. 27, 2023 for corresponding CN Patent Application.
JP Office Action dated May 17, 2023.

* cited by examiner

*Primary Examiner* — Medhanit W Bahta
(74) *Attorney, Agent, or Firm* — Harvest IP Law, LLP

(57) ABSTRACT

The present invention relates to cyclododecanone and a preparation method therefor. According to the present invention, a cyclododecanone preparation method capable of achieving a high conversion rate and minimizing unreacted materials and the production of reaction byproducts can be provided. In addition, the present invention implements a high conversion rate and selectivity despite a simplified process, and thus can be helpfully utilized in economical laurolactam production methods that are easy to mass-produce commercially. According to the present invention, the proportions of cyclododecanol, cyclododecadiol, and the like, obtained as reaction byproducts, in the final product can be drastically reduced, and cyclododecanone can be produced at a high conversion rate.

15 Claims, No Drawings

CYCLODODECANONE AND PREPARATION METHOD THEREFOR

CROSS-REFERENCE TO RELATED APPLICATIONS

This application is a National Stage of International Application No. PCT/KR2020/014666 filed Oct. 26, 2020, claiming priority based on Korean Patent Application No. 10-2019-0135498 filed Oct. 29, 2019, the disclosure of which is incorporated herein by reference in its entirety.

TECHNICAL FIELD

The present invention relates to a cyclododecanone and a preparation method therefor.

BACKGROUND ART

A cyclododecanone (CDON) is used for the preparation of laurolactam, and the laurolactam is an organic compound used as a monomer for preparing a polyamide (e.g., nylon-12, nylon 6-12, etc.), which is an engineering plastic.

The preparation of a cyclododecanone may generally be carried out starting from cyclododecatriene (CDT). Specifically, a cyclododecanone may be prepared by preparing cyclododecene (CDEN) through selective hydrogenation in cyclododecatriene and then oxidizing the CDEN. However, according the preparation method for a cyclododecanone described above, there is a problem in that a significant amount of by-products (e.g., cyclododecanol, cyclododecadiol, etc.) are generated.

Accordingly, the problem of the related art described above has a detrimental effect on establishing an entire process system for laurolactam production, so research to find a more efficient method is still needed.

In order to solve the problems of the related art, the present inventors have intensified research on an efficient preparation method for a cyclododecanone. As a result, the present inventors confirmed that a cyclododecanone may be prepared with a significantly improved conversion rate and selectivity by adjusting an addition form of hydrogen peroxide in the introduction of an intermediate step using epoxidized cyclododecene as an intermediate, and completed the present invention

DISCLOSURE

Technical Problem

An object of the present invention is to provide a cyclododecanone prepared with a high conversion rate and selectivity and a preparation method for a cyclododecanone capable of preparing the same.

Another object of the present invention is to provide a preparation method for a cyclododecanone capable of effectively suppressing the decomposition of hydrogen peroxide to increase the selectivity of hydrogen peroxide.

Another object of the present invention is to provide a preparation method for a cyclododecanone having economical efficiency with a more simplified process configuration.

Technical Solution

In one general aspect, a preparation method for a cyclodo- decanone includes: preparing an epoxidized cyclododecane by applying heat while additionally adding hydrogen peroxide to a mixture of cyclododecene and hydrogen peroxide under a catalyst system containing a tungsten compound, a phosphoric acid compound, and an amine compound; preparing a cyclododecanone through a rearrangement reaction without separation of a reaction mixture containing the epoxidized cyclododecane under an alkali metal halide catalyst; and purifying the cyclododecanone by mixing the reaction mixture containing the cyclododecanone with an aqueous organic acid solution and stirring them.

The additionally added hydrogen peroxide may be added so as to satisfy the following Equation:

$$50 \leq In_f \leq 150$$

$$1.0 \leq In_m \leq 3.0 \quad \text{[Equation]}$$

wherein $In_f$ is a flow rate (µl/min) of additionally added hydrogen peroxide (B), and $In_m$ is a molar ratio (B/A) of cyclododecene (A) and additionally added hydrogen peroxide (B).

The mixture may substantially not contain cyclododecane.

The mixture may be mixed with 1 to 10 parts by weight of hydrogen peroxide, based on 100 parts by weight of the cyclododecene.

The tungsten compound may be one or a mixture of two or more selected from tungstic acid and a salt of tungstic acid.

The phosphoric acid compound may be one or a mixture of two or more selected from an inorganic phosphoric acid, inorganic phosphate, an organic phosphoric acid, and the like.

The amine compound may be one or a mixture of two or more selected from a tertiary amine, a quaternary ammonium salt, and the like.

The catalyst system may be contained in an amount of 0.001 to 10 parts by weight, based on 100 parts by weight of the cyclododecene.

In the catalyst system, the tungsten compound (a), the phosphoric acid compound (b), and the amine compound (c) may be mixed in a weight ratio of 1:0.1 to 2.0:0.1 to 5.0.

The preparing of the epoxidized cyclododecane may be carried out under a temperature condition of 50 to 120° C.

The rearrangement reaction may be carried out without a solvent.

The alkali metal halide catalyst may be contained in an amount of 0.01 to 10 parts by weight, based on 100 parts by weight of the epoxidized cyclododecane.

The aqueous organic acid solution may contain 1 to 95 wt % of the organic acid.

In the purifying of the cyclododecanone, 20 to 150 parts by weight of the aqueous organic acid solution may be mixed, based on 100 parts by weight of the reaction mixture containing the cyclododecanone.

The purifying of the cyclododecanone may further include additionally purifying the cyclododecanone by mixing the cyclododecanone with water and stirring them.

The alkali metal concentration of the reaction product prepared in the purifying of the cyclododecanone may be 100 ppm or less.

In another general aspect, there is provided a cyclododecanone prepared by the preparation method as described above, wherein the cyclododecene and the epoxidized cyclododecane each have a conversion rate of 90% or more.

Advantageous Effects

According to the present invention, the proportions of cyclododecanol, cyclododecadiol, and the like, obtained as reaction byproducts, in the final product may be drastically reduced, and a cyclododecanone may be prepared at a high conversion rate.

In addition, according to the present invention, separation and purification processes for removing reaction by-products are also unnecessary. Accordingly, the present invention has the advantage that a simplified process configuration is provided so that a preparation method for a cyclododecanone that is easy to mass-produce commercially may be provided.

In addition, according to the present invention, by adjusting an addition form of hydrogen peroxide, the decomposition of hydrogen peroxide itself may be effectively suppressed, and the selectivity of hydrogen peroxide may be increased. Accordingly, the present invention has the advantage in that an explosive reaction due to decomposition of hydrogen peroxide may be prevented, and thus reaction heat may be efficiently controlled, thereby increasing process convenience

BEST MODE

Hereinafter, a preparation method for a cyclododecanone according to the present invention will be described in detail, but technical terms and scientific terms used herein have the general meaning understood by those skilled in the art to which the present invention pertains, unless otherwise defined, and a description for the known function and configuration unnecessarily obscuring the gist of the present invention will be omitted in the following description.

The present invention intends to propose a preparation method for a cyclododecanone capable of implementing a high conversion rate and selectivity in a very economical way, in view of the problems of the related art described above.

According to the present invention, a high conversion rate is implemented, and no additional separation and purification steps are involved due to the minimized generation of unreacted products and reaction by-products, such that the process configuration may be simplified. In addition, according to the present invention, it is possible to provide a stable preparation process that maximizes catalytic activity and does not have a risk of explosion due to hydrogen peroxide.

Accordingly, according to the present invention, the present invention may have a very advantageous advantage to be applied to actual industry due to a simplified process configuration that may exhibit high conversion rate and selectivity and may be operated continuously.

As mentioned above, the present invention intends to propose the preparation of a cyclododecanone by confirming that it is possible to efficiently prepare a cyclododecanone through a rearrangement reaction carried out under an alkali metal halide catalyst as well as an unexpected improvement of a conversion rate and selectivity by controlling the addition form of hydrogen peroxide.

Hereinafter, a preparation method for a cyclododecanone according to the present invention will be described in detail.

The preparation method for a cyclododecanone according to an embodiment of the present invention includes: (1) preparing an epoxidized cyclododecane by applying heat while additionally adding hydrogen peroxide to a mixture of cyclododecene and hydrogen peroxide under a catalyst system containing a tungsten compound, a phosphoric acid compound, and an amine compound; (2) preparing a cyclododecanone from a reaction mixture containing the epoxidized cyclododecane through a rearrangement reaction under an alkali metal halide catalyst; and (3) purifying the cyclododecanone by mixing the reaction mixture containing the cyclododecanone with an aqueous organic acid solution and stirring them. In this case, the reaction mixture containing the epoxidized cyclododecane may be used without an additional separation and purification process in Step (1).

Specifically, in the preparation method for a cyclododecanone according to the present invention, the addition form of hydrogen peroxide may be a form of continuously adding hydrogen peroxide in a reactor including a mixture in which 10 parts by weight or less of hydrogen peroxide is mixed, based on 100 parts by weight of the cyclododecene.

The present invention notes that the improvement of a conversion rate and selectivity according to the present invention depends on the addition form of hydrogen peroxide described above, but the effect is surprisingly improved depending on a molar ratio of the total added hydrogen peroxide (based on a cyclododecanone) and an added flow rate.

In the preparation method for a cyclododecanone according to an embodiment of the present invention, the additionally added hydrogen peroxide is characterized in that it follows the addition form described above, and when hydrogen peroxide is added so as to satisfy the following Equation, a surprisingly improved conversion rate and selectivity may be implemented:

$$50 \leq In_f \leq 150$$

$$1.0 \leq In_m \leq 3.0 \quad \text{[Equation]}$$

wherein $In_f$ is a flow rate (μl/min) of additionally added hydrogen peroxide (B), and $In_m$ is a molar ratio (B/A) of cyclododecene (A) and additionally added hydrogen peroxide (B).

The $In_f$ may specifically satisfy a flow rate of 60 to 140 μl/min, and more specifically 70 to 120 μl/min. In this case, the $In_f$ is a flow rate based on a 0.1 L reactor, and may follow a flow rate of a quantitatively increased value according to an increase in the capacity of the reactor.

For example, additionally added hydrogen peroxide (B) may be added through a pump at the flow rate described above into the reactor containing the reaction solution.

For example, the hydrogen peroxide may be pure hydrogen peroxide, an aqueous hydrogen peroxide solution, or the like, and the aqueous hydrogen peroxide solution may have a concentration of 30 wt %, 34.5 wt %, 50 wt %, or the like.

In addition, the $In_m$ may specifically satisfy a molar ratio (B/A) of 1.5 to 2.5, and more specifically, a molar ratio (B/A) of 2.0 to 2.4.

If the Equation described above is not satisfied, excessive reaction by-product generation is caused, decomposition of hydrogen peroxide is accelerated, and selectivity for epoxidation (selectivity of hydrogen peroxide) is degraded, which is undesirable because of unfavorable efficiency. In addition, excessive supply of hydrogen peroxide is undesirable because it increases an interface temperature of the two liquid phase systems during the process to rapidly generate peroxidized reaction by-products.

If the Equation described above is not satisfied, the reaction by-product produced may be cyclododecanol, cyclododecadiol, or the like. Accordingly, cyclododecene or a mixture containing the cyclododecene, which is the starting material of the preparation method for a cyclododecanone according to an embodiment of the present invention, may substantially not contain cyclododecane.

In the preparation method for a cyclododecanone according to an embodiment of the present invention, the mixture may be mixed with 1 to 10 parts by weight of hydrogen peroxide, based on 100 parts by weight of the cyclododecene, specifically 1 to 8 parts by weight, and more specifically 1 to 5 parts by weight of hydrogen peroxide may be mixed with the cyclododecene. A small amount of hydrogen peroxide contained in the mixture is for maximizing catalytic activity, not as an oxidizing agent. Accordingly, when the amount of hydrogen peroxide contained in the mixture is out of the range described above, the catalytic activity is degraded, which is not desirable.

In the preparation method for a cyclododecanone according to an embodiment of the present invention, a tungsten compound that may be contained in the catalyst system may be one or a mixture of two or more selected from tungstic acid and a salt of tungstic acid.

Examples of the tungsten compound may include tungstic acid in the form of monohydrate or dihydrate of tungsten trioxide; tungstates such as sodium tungstate, potassium tungstate, calcium tungstate, and ammonium tungstate; and the like.

For example, when the tungsten compound contained in the catalyst system includes the tungstic acid described above, the catalyst system may have the form of a heterogeneous catalyst system.

For example, when the tungsten compound contained in the catalyst system includes one or a mixture of two or more selected from the tungstates described above, the catalyst system may have the form of a homogeneous catalyst system.

For example, when the catalyst system contains both the tungstic acid described above and the tungstates described above, it is possible to implement a more improved conversion rate, which is preferable.

In the preparation method for a cyclododecanone according to an embodiment of the present invention, the phosphoric acid compound that may be contained in the catalyst system may be one or a mixture of two or more selected from an inorganic phosphoric acid, an inorganic phosphate, an organic phosphoric acid, and the like.

Examples of the phosphoric acid compound may include inorganic phosphoric acids such as phosphoric acid, polyphosphoric acid, and pyrophosphoric acid; inorganic phosphates such as sodium phosphate, potassium phosphate, ammonium phosphate, sodium hydrogen phosphate, potassium hydrogen phosphate, ammonium hydrogen phosphate, sodium dihydrogen phosphate, potassium dihydrogen phosphate, and calcium dihydrogen phosphate; organic phosphoric acids such as monomethyl phosphoric acid, dimethyl phosphoric acid, trimethyl phosphoric acid, triethyl phosphoric acid, and triphenyl phosphoric acid; and the like.

In the preparation method for a cyclododecanone according to an embodiment of the present invention, an amine compound that may be contained in the catalyst system may be one or a mixture of two or more selected from a tertiary amine, a quaternary ammonium salt, and the like.

Examples of the amine compound may include a tertiary amine selected from trimethylamine, dimethylethylamine, diethylmethylamine, butyldimethylamine, dimethylisopropylamine, triethylamine, tripropylamine, tributylamine, tripentylamine, triisoamylamine, trihexylamine, triheptylamine, trioctylamine, and tri-(2-ethylhexyl)amine; and quaternary ammonium salts selected from dodecyltrimethylammonium salts, hexadecyltrimethylammonium salts, octadecyltrimethylammonium salts, methyltributylammonium salts, and methyltrioctylammonium salts; and the like.

Specifically, in Step (1) of preparing the epoxidized cyclododecane, it is preferable that oxidation is carried out in two liquid phase systems consisting of a liquid phase containing cyclododecene and another liquid phase containing an aqueous hydrogen peroxide solution, and after completion of the reaction, the two liquid phase systems undergo phase separation quickly. Accordingly, the amine compound contained in the catalyst system preferably includes a long-chain alkyl having 3 or more carbon atoms, preferably 5 or more carbon atoms, and more preferably 7 or more carbon atoms.

In the preparation method for a cyclododecanone according to an embodiment of the present invention, the catalyst system may be contained in an amount of 0.001 to 10 parts by weight, specifically 0.01 to 5 parts by weight, and more specifically 0.1 to 1.0 parts by weight, based on 100 parts by weight of the cyclododecene.

In the preparation method for a cyclododecanone according to an embodiment of the present invention, the tungsten compound (a), the phosphoric acid compound (b), and the amine compound (c) in the catalyst system may be mixed in a weight ratio (a:b:c) of 1:0.1 to 2.0:0.1 to 5.0. The weight ratio (a:b:c) may be specifically 1:0.5-1.5:0.5-3.0, and more specifically 1:0.8-1.0:1.0-2.5.

In the preparation method for a cyclododecanone according to an embodiment of the present invention, Step (1) of preparing the epoxidized cyclododecane may be carried out under a temperature condition of 50 to 120° C.

For example, Step (1) may be carried out for 0.5 to 12 hours under the temperature condition of 60 to 100° C.

For example, Step (1) may be carried out for 2 to 8 hours under the temperature condition of 70 to 90° C.

In addition, in the preparation method for a cyclododecanone according to an embodiment of the present invention, Step (2) of preparing a cyclododecanone through the rearrangement reaction may be performed under an alkali metal halide catalyst.

Examples of the alkali metal halide catalyst may include KI, NaI, LiI, NaCl, KCl, LiCl, NaBr, KBr and LiBr, and may be one or a mixture of two or more selected among them.

Step (2) of preparing a cyclododecanone through the rearrangement reaction may be carried out without a solvent. In addition, Step (2) is carried out under an inert gas atmosphere.

The inert gas is not limited as long as it is a conventional gas, and examples thereof may be one or more mixed gases selected from helium gas, argon gas, nitrogen gas, neon gas, and the like.

In addition, Step (2) of preparing a cyclododecanone through the rearrangement reaction may use a crude reaction mixture containing the epoxidized cyclododecane obtained from Step (1) described above. Accordingly, Step (2) may implement an improved conversion rate and selectivity.

The reaction mixture containing the epoxidized cyclododecane obtained from Step (1) has a favorable effect on the conversion rate and selectivity of the subsequent Step (2).

For example, in Step (1), the conversion rate of the cyclododecene may be 90% or more, specifically 95% or more and 99.99% or less, or 95% or more and 99.9% or less, and more specifically, 98% or more and 99.99% or less.

For example, in Step (2), the conversion rate of the epoxidized cyclododecane may be 90% or more, specifically 95% or more and 99.99% or less, or 95% or more and 99.9% or less, and more specifically, 98% or more and 99.99% or less.

For example, the reaction mixture containing the epoxidized cyclododecane obtained from Step (1) does not involve further separation and purification processes after Step (1) is completed, and the subsequent Step (2) may be performed as a continuous process. Accordingly, the present invention may provide a more simplified process.

Step (2) of preparing the cyclododecanone through the rearrangement reaction may include 0.01 to 10 parts by weight based on 100 parts by weight of the epoxidized cyclododecane. Specifically, the alkali metal halide catalyst is preferably contained in an amount of 0.1 to 5 parts by weight, more specifically 0.5 to 3 parts by weight.

In the preparation method for a cyclododecanone according to an embodiment of the present invention, Step (2) of preparing a cyclododecanone through the translocation reaction may be carried out under the temperature condition of 100 to 300° C.

For example, Step (2) may be carried out for 0.5 to 8 hours under the temperature condition of 120 to 250° C.

For example, Step (2) may be carried out for 0.5 to 6 hours under the temperature condition of 150 to 230° C.

Step (3) is a step of purifying a cyclododecanone by mixing the reaction mixture containing the cyclododecanone with an aqueous organic acid solution and stirring them.

The alkali metal halide catalyst used in Step (2) of the present invention may interact with an oxidizing material in a polar solvent, particularly when the oxidizing material such as oxygen is present in the solvent, thereby remaining as an impurity in the organic layer. In order to solve the problem that occurs as the alkali metal halide catalyst remains, the catalyst impurities may be effectively separated by further performing a simplified process of mixing the reaction mixture containing the cyclododecanone with the aqueous organic acid solution and stirring them.

The mixing and stirring process of Step (3) may be carried out by lowering the temperature under the temperature and stirring conditions of the second step. The mixing and stirring process may be carried out, for example, at a temperature of 50 to 150° C., for example, 50 to 130° C., 50 to 110° C., 50 to 100° C., or 70 to 90° C., but the present invention is not limited thereto.

The aqueous organic acid solution may be an aqueous solution containing 1 to 95 wt %, preferably 5 to 80 wt %, and more preferably 10 to 70 wt % of an organic acid. If the content of the organic acid is excessively low, it is difficult to remove the catalyst impurities in the organic layer of the reaction product of Step (2), and if the content of the organic acid is excessively high, it is difficult to separate and remove reactants of the catalyst impurities and the organic acid into a water phase.

In Step (3), based on 100 parts by weight of the reaction mixture containing a cyclododecanone, 20 to 150 parts by weight, for example 30 to 150 parts by weight, 40 to 150 parts by weight, 50 to 150 parts by weight, 80 to 150 parts by weight, or 80 to 120 parts by weight of the aqueous organic acid solution may be contained. If the content of the aqueous organic acid solution is less than 20 parts by weight, it is difficult to remove catalyst impurities, and if the content of the aqueous organic acid solution exceeds 150 parts by weight, the waste liquid to be treated increases, which is not preferable in terms of process simplification and cyclododecanone purification.

Examples of the organic acid may include at least one selected from lactic acid, acetic acid, formic acid, citric acid, oxalic acid and uric acid, preferably acetic acid or formic acid, and more preferably acetic acid.

For example, Step (3) may further include purifying a cyclododecanone with an aqueous organic acid solution, followed by further mixing and stirring with water for purification. Accordingly, the catalyst impurities remaining in the organic layer may be more effectively removed.

The alkali metal concentration of the reaction product prepared in Step (3) may be 100 ppm or less, 95 ppm or less, 90 ppm or less, or 85 ppm or less, preferably 80 ppm or less, 70 ppm or less, 60 ppm or less, or 50 ppm or less, and more preferably 40 ppm or less or 30 ppm or less. If the alkali metal concentration is within the above range, it can be confirmed that the alkali metal halide catalyst remaining as an impurity in the cyclododecanone was effectively removed. Meanwhile, the alkali metal may be derived from the alkali metal halide catalyst used in the rearrangement reaction.

In another aspect of the present invention, provided is a cyclododecanone prepared by the preparation method for a cyclododecanone, wherein the conversion rate of the cyclododecene and the conversion rate of the epoxidized cyclododecane are each independently 90% or more, for example, each independently 93% or more, each independently 95% or more, each independently 96% or more, preferably each independently 97% or more, and more preferably each independently 98% or more.

As described above, the preparation method for a cyclododecanone according to the present invention provides high conversion rate and selectivity as an intermediate step for the preparation of laurolactam. Specifically, the conversion rate for a cyclododecanone through the cyclododecene reaches at least 90% or more, and such a high conversion rate may correspond to a significant increase in conversion rate compared to the related art. Due to such a significant effect, the method for preparing a cyclododecanone according to the present invention is expected to be usefully applied to a process system for commercialization of laurolactam.

Hereinafter, an aspect employing the preparation method of the present invention described above will be described in detail.

In an aspect, the preparation method for a cyclododecanone described above may be employed as an intermediate step in the reaction during the preparation of laurolactam.

Specifically, the preparation method for laurolactam includes: (1) preparing an epoxidized cyclododecane by applying heat while additionally adding hydrogen peroxide to a mixture of cyclododecene and hydrogen peroxide under a catalyst system containing a tungsten compound, a phosphoric acid compound, and an amine compound; (2) preparing a cyclododecanone from a reaction mixture containing the epoxidized cyclododecane through a rearrangement reaction under an alkali metal halide catalyst; (3) preparing a cyclododecanone oxime by ammonia oxidation in the cyclododecanone; and (4) preparing laurolactam through the Beckman rearrangement reaction in the cyclododecanone oxime.

The preparation method for laurolactam according to an embodiment of the present invention provides an excellent effect on the conversion rate up to the final step by employing the preparation method for a cyclododecanone of the present invention as described above. Here, the conversion rate up to the final step refers to the conversion rate in the total steps including Step (1) to Step (4).

Specifically, in the preparation method for laurolactam according to an embodiment of the present invention, the conversion rate up to the final step is 90% or more, which may provide the desired laurolactam with a significantly improved conversion rate.

Step (3) of preparing the cyclododecanone oxime may be carried out by reacting ammonia; hydrogen peroxide; catalysts containing titanium silicalite, and the like; and a reactive activator containing ammonium acetate, and the like with a cyclododecanone in a solvent containing ethanol.

For example, in Step (3), after mixing a cyclododecanone, a catalyst, and a reaction activator in a solvent containing ethanol in a reactor, and then ammonia gas may be added until it becomes 1.3 to 2.5 bar in the reactor. Thereafter, hydrogen peroxide in the reactor may be added through a pump at a flow rate of 0.5 to 3.5 ml/min.

For example, Step (3) may be carried out for 15 to 70 minutes under the temperature condition of 50 to 100° C.

In the preparation method for laurolactam according to an embodiment of the present invention, in Step (3) of preparing the cyclododecanone oxime, the conversion rate from a cyclododecanone may be 99% or more, and specifically, 99 to 99.99%.

Step (4) of preparing the laurolactam may be prepared through a conventional Beckman rearrangement reaction using the cyclododecanone oxime prepared by the method described above.

The Beckman rearrangement reaction may be performed using a catalyst system in which a main catalyst containing cyanuric chloride and the like and a cocatalyst containing zinc chloride and the like are mixed each other.

For example, Step (4) may be carried out in a solvent containing isopropylcyclohexane and the like for 1 to 20 minutes under the temperature condition of 70 to 130° C.

In the preparation method for laurolactam according to an embodiment of the present invention, in Step (4) of preparing the cyclododecanone oxime, the conversion rate from cyclododecanone oxime may be 99% or more, and specifically, 99 to 99.99%.

In addition, in the preparation method for laurolactam according to an embodiment of the present invention, the selectivity of the laurolactam may be 99% or more, and specifically, 99 to 99.99%.

A novel preparation method for laurolactam including an intermediate step of using the epoxidized cyclododecane of the present invention as an intermediate will be described in more detail through the following examples. The following Examples are only a reference for describing the present invention in detail, and the present invention is not limited thereto and may be implemented in various forms.

In addition, all technical terms and scientific terms have the same meanings as those commonly understood by a person skilled in the art to which the present invention pertains unless otherwise defined. The terms used herein are only for effectively describing a certain exemplary embodiment, and are not intended to limit the present invention.

In addition, the unit of the amount used, which is not specifically described in the specification, may be g.

Example 1

Step 1. Preparation Method for Epoxidized Cyclododecane

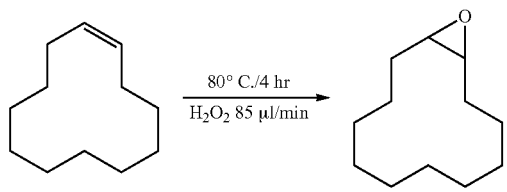 [SMILES: C1=C\CCCCCCCCCC/1 ; C1CCCCCC2OC2CCCC1]

To a high-speed stirring batch reactor (100 ml) were added 25 g of cyclododecene, 0.075 g of $H_2WO_4$, 0.06 g of $H_3PO_4$, 0.105 g of tri-n-octylamine, 1.4 g of $H_2O$, and 1.02 g of 50 wt % $H_2O_2$. Thereafter, the reaction was allowed to proceed at 80° C. for a total of 4 hours. While stirring the reactor contents at 1500 rpm during the reaction, 85 µl of hydrogen peroxide (50 wt % in water) was additionally added per minute through a pump.

Cyclododecene according to the preparation method had a conversion rate of 98.8% and selectivity of 99.9%.

Step 2. Preparation Method for Cyclododecanone

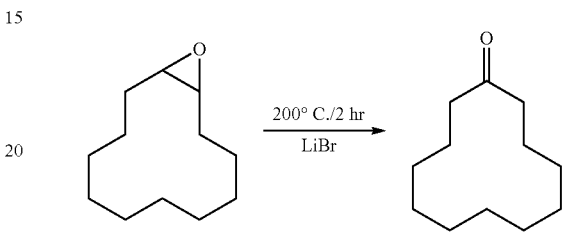

To a 50 mL round flask were added 5 g of the reaction mixture containing the epoxidized cyclododecane obtained in Step 1, and 0.085 g of lithium bromide (LiBr) under an inert condition using a glovebox. Then, after making a nitrogen balloon and connecting the nitrogen balloon to the flask, the resulting mixture was placed in an oil bath containing silicone oil and the reaction was allowed to proceed at 200° C. for a total of 2 hours.

Step 3. Purification Method of Cyclododecanone

After lowering the temperature to 80° C., 5 g of a 10% aqueous acetic acid solution was added and the mixture stirred vigorously for 5 minutes. Stirring was stopped, and when layer separation occurred, the water layer was removed. 5 g of water was added to the remaining organic layer and the mixture was stirred vigorously for 5 minutes. When layer separation occurred, the water layer was removed. The concentration of lithium (Li) in the organic layer including the prepared cyclododecanone is shown in Table 3 below.

The epoxidized cyclododecane according to the above preparation method had a conversion rate of 99.5% and selectivity of 99.8%.

Examples 2 to 6

As shown in Table 1 below, an amount and a form of added hydrogen peroxide were adjusted, and each reaction was performed in a manner similar to that of Example 1.

As a result, the conversion rate and selectivity of each step are shown in Table 2 below.

TABLE 1

| Step 1. | Mixture[1] (g) | Hydrogen peroxide[2] | | $In_m$ |
|---|---|---|---|---|
| | | Flow rate (µl/min) | Total added amount[3] (g) | |
| Example 1 | 25:1.02 | 85 | 24.48 | 2.39 |
| Example 2 | 25:0.1 | 85 | 24.48 | 2.39 |
| Example 3 | 25:5.6 | 85 | 24.48 | 2.39 |
| Example 4 | 25:40 | 45 | 12.96 | 2.53 |

TABLE 1-continued

| Step 1. | Mixture[1] (g) | Hydrogen peroxide[2] | | $In_m$ |
|---|---|---|---|---|
| | | Flow rate (μl/min) | Total added amount[3] (g) | |
| Example 5 | 25:1.02 | 40 | 12.96 | 2.53 |
| Example 6* | 25:1.02 | 160 | 17.28 | 3.38 |

Mixture[1]: A mixture of cyclododecene and 50 wt % hydrogen peroxide, and amounts of respective components that are used Hydrogen peroxide[2]: Additionally added hydrogen peroxide Total added amount[3]: Total amount of additionally added hydrogen peroxide (B) $In_m$: a molar ratio (B/A) of (B) based on cyclododecene (A)
Example 6*: The reaction time is 1.5 hours.

TABLE 2

| | Conversion rate[1] | Selectivity[2] |
|---|---|---|
| Example 1 | 99.5 | 99.8 |
| Example 2 | 90.1 | 91.7 |
| Example 3 | 90.3 | 90.3 |
| Example 4 | 86.2 | 82.4 |
| Example 5 | 90.2 | 90.0 |
| Example 6 | 90.7 | 90.0 |

Conversion rate[1] and selectivity[2] are the meaning ranges for the epoxidized cyclododecane according to Step 2.

Example 7

Step 1. Preparation Method for Epoxidized Cyclododecane

To a high-speed stirring batch reactor (100 ml) were added 25 g of cyclododecene, 0.1 g of $Na_2WO_4$, 0.06 g of $H_3PO_4$, 0.12 g of Aliquot 336 (Cognis), 1.4 g of $H_2O$, and 1.02 g of 50 wt % $H_2O_2$. Thereafter, the reaction was allowed to proceed at 80° C. for a total of 4 hours. While stirring the reactor contents at 1500 rpm during the reaction, 85 μl of hydrogen peroxide was additionally added per minute through a pump.

Cyclododecene according to the preparation method had a conversion rate of 96.0% and selectivity of 98.1%.

Step 2. Preparation Method for Cyclododecanone

The reaction was carried out in the same manner as in Example 1, Step 2, using the reaction mixture containing the epoxidized cyclododecane obtained in Step 1.

Step 3. Purification Method of Cyclododecanone

The reaction was carried out in the same manner as in Example 1, Step 3.
The epoxidized cyclododecane according to the above preparation method had a conversion rate of 99.0% and selectivity of 99.3%.

Example 8

Step 1. Preparation Method for Epoxidized Cyclododecane

To a high-speed stirring batch reactor (100 ml) were added 25 g of cyclododecene, 0.075 g of $H_2WO_4$, 0.06 g of $H_3PO_4$, 0.12 g of Aliquot 336 (Cognis), 1.4 g of $H_2O$, and 1.02 g of 50 wt % $H_2O_2$. Thereafter, the reaction was allowed to proceed at 80° C. for a total of 4 hours. While stirring the reactor contents at 1500 rpm during the reaction, 85 μl of hydrogen peroxide was additionally added per minute through a pump.

Cyclododecene according to the preparation method had a conversion rate of 99.8% and selectivity of 98.8%.

Step 2. Preparation Method for Cyclododecanone

The reaction was carried out in the same manner as in Example 1, Step 2, using the reaction mixture containing the epoxidized cyclododecane obtained in Step 1.

Step 3. Purification Method of Cyclododecanone

The reaction was carried out in the same manner as in Example 1, Step 3.
The epoxidized cyclododecane according to the above preparation method had a conversion rate of 99.0% and selectivity of 99.3%.
The epoxidized cyclododecane according to the above preparation method had a conversion rate of 99.2% and selectivity of 99.0%.

Comparative Example 1

Comparative Example 1 was carried out in the same manner as in Example 1, except that the reaction was carried out by mixing the total amount of hydrogen peroxide used in Example 1, Step 1 in the initial reactor.

In this case, an explosive gas was generated by hydrogen peroxide and the temperature was increased, and the reaction had to be terminated during the reaction.

As confirmed in the above Examples, according to the present invention, it was confirmed that a cyclododecanone may be prepared from cyclododecene with a high conversion rate and selectivity. In particular, it can be confirmed that when the flow rate and total amount of additionally added hydrogen peroxide satisfy the Equation described above, a surprisingly improved effect on a conversion rate and selectivity was exhibited.

In addition, it was confirmed that if the amount of hydrogen peroxide mixed in the initial reactor in Step 1 is small, the conversion rate may be slightly degraded due to the formation of the catalyst. In addition, it was confirmed that when the amount of hydrogen peroxide mixed in the initial reactor in Step 1 is excessive, even if the total amount of hydrogen peroxide used is the same, the selectivity for epoxidation was degraded due to the decomposition of hydrogen peroxide, so that the overall conversion rate may be degraded.

Also, as confirmed in the above Example, according to the present invention, by minimizing the reaction by-products as well as unreacted products, separation and purification processes for removing the reaction by-products are also unnecessary. Accordingly, the present invention provides a simplified process configuration, which is advantageous for commercial mass production.

Comparative Example 2

Comparative Example 2 was carried out in the same manner as in Example 1, except that Step 3 was not carried out. The concentration of lithium (Li) in the organic layer including the prepared cyclododecanone is shown in Table 3 below.

Comparative Example 3

Comparative Example 3 was carried out in the same manner as in Example 1, except that 5 g of water was used instead of 5 g of 10% aqueous acetic acid solution in Step 3. The concentration of lithium (Li) in the organic layer including the prepared cyclododecanone is shown in Table 3 below.

Comparative Example 4

Comparative Example 4 was carried out in the same manner as in Example 1, except that 5 g of 100% acetic acid was used instead of 5 g of 10% aqueous acetic acid solution in Step 3. The concentration of lithium (Li) in the organic layer including the prepared cyclododecanone is shown in Table 3 below.

TABLE 3

|  | Li (ppm) |
| --- | --- |
| Example 1 | ND (<30 ppm) |
| Comparative Example 2 | 1,335 |
| Comparative Example 3 | 435 |
| Comparative Example 4 | — |

It was found from Table 3 that the cyclododecanone reaction product prepared in Example 1 had a lithium content of 1,335 ppm in the organic layer before extraction with a 10 wt % aqueous organic acid solution, but the lithium content was reduced to 62 ppm after extraction with 10 wt % acetic acid and 30 ppm or less after additional washing with water, so the remaining catalyst impurities were very effectively removed. In Comparative Example 2, the washing process was not performed, so the lithium content in the organic layer was high as 1,335 ppm, and in Comparative Example 3, after washing twice with only water without acetic acid, the content of lithium remaining in the organic layer was relatively high as 435 ppm. Comparative Example 4 was extracted with 100 wt % acetic acid, but the organic layer and the water layer did not separate, so the remaining catalyst impurities could not be removed. In short, according to the present invention, it is expected that a cyclododecanone having a high conversion and selectivity with a simplified process configuration may be provided under very economical conditions, which may be usefully utilized in a process system for commercialization of laurolactam.

Hereinabove, although the present invention has been described by specific matters, the limited embodiments, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

The invention claimed is:

1. A preparation method for a cyclododecanone, comprising:
   preparing an epoxidized cyclododecane by applying heat while additionally adding hydrogen peroxide to a mixture of cyclododecene and hydrogen peroxide so that the following equation is satisfied under a catalyst system containing a tungsten compound, a phosphoric acid compound, and an amine compound;
   preparing a cyclododecanone through a rearrangement reaction without separation of a reaction mixture containing the epoxidized cyclododecane under an alkali metal halide catalyst; and
   purifying the cyclododecanone by mixing the reaction mixture containing the cyclododecanone with an aqueous organic acid solution and stirring them:

$$50 \leq In_f \leq 150$$

$$1.0 \leq In_m \leq 3.0 \qquad \text{[Equation]}$$

wherein
$In_f$ is a flow rate (µl/min) of additionally added hydrogen peroxide (B), and
$In_m$ is a molar ratio (B/A) of cyclododecene (A) and additionally added hydrogen peroxide (B).

2. The preparation method for a cyclododecanone of claim 1, wherein the mixture does not contain cyclododecane.

3. The preparation method for a cyclododecanone of claim 1, wherein the mixture is mixed with 1 to 10 parts by weight of hydrogen peroxide, based on 100 parts by weight of the cyclododecene.

4. The preparation method for a cyclododecanone of claim 1, wherein the tungsten compound is tungstic acid, a salt of tungstic acid, or a mixture thereof.

5. The preparation method for a cyclododecanone of claim 1, wherein the phosphoric acid compound is an inorganic phosphoric acid, inorganic phosphate, an organic phosphoric acid, or a mixture thereof.

6. The preparation method for a cyclododecanone of claim 1, wherein the amine compound is a tertiary amine, a quaternary ammonium salt, and a mixture thereof.

7. The preparation method for a cyclododecanone of claim 1, wherein the catalyst system is contained in an amount of 0.001 to 10 parts by weight, based on 100 parts by weight of the cyclododecene.

8. The preparation method for a cyclododecanone of claim 7, wherein in the catalyst system, the tungsten compound (a), the phosphoric acid compound (b), and the amine compound (c) are mixed in a weight ratio of 1:0.1 to 2.0:0.1 to 5.0.

9. The preparation method for a cyclododecanone of claim 1, wherein the preparing of the epoxidized cyclododecane is carried out under a temperature condition of 50 to 120° C.

10. The preparation method for a cyclododecanone of claim 1, wherein the rearrangement reaction is carried out without a solvent.

11. The preparation method for a cyclododecanone of claim 1, wherein the alkali metal halide catalyst is contained in an amount of 0.01 to 10 parts by weight, based on 100 parts by weight of the epoxidized cyclododecane.

12. The preparation method for a cyclododecanone of claim 1, wherein the aqueous organic acid solution contains 1 to 95 wt % of the organic acid.

13. The preparation method for a cyclododecanone of claim 1, wherein in the purifying of the cyclododecanone, 20 to 150 parts by weight of the aqueous organic acid solution is mixed, based on 100 parts by weight of the reaction mixture containing the cyclododecanone.

14. The preparation method for a cyclododecanone of claim 1, wherein the purifying of the cyclododecanone further includes additionally purifying the cyclododecanone by mixing the cyclododecanone with water and stirring them.

15. The preparation method for a cyclododecanone of claim 1, wherein the alkali metal concentration of the reaction product prepared in the purifying of the cyclododecanone is 100 ppm or less.

\* \* \* \* \*